United States Patent [19]

Hoffmeister et al.

[11] Patent Number: 4,561,568
[45] Date of Patent: Dec. 31, 1985

[54] LIQUID FUEL EXPULSION SYSTEM

[75] Inventors: Lawrence D. Hoffmeister, New Market; Jimmy M. Madderra; Richard J. Thompson, both of Huntsville, all of Ala.

[73] Assignee: The United States of America as represented by the Secretary of the Army, Washington, D.C.

[21] Appl. No.: 585,704

[22] Filed: Mar. 2, 1984

[51] Int. Cl.$^4$ .............................................. B67D 5/42
[52] U.S. Cl. .................................. 222/130; 222/389; 222/541; 220/3; 220/414; 138/31
[58] Field of Search ............... 222/130, 183, 386, 387, 222/389, 541, 129; 220/3, 85 A, 85 B, 20, 414; 138/26, 31

[56] References Cited

U.S. PATENT DOCUMENTS

| | | | |
|---|---|---|---|
| 2,951,614 | 9/1960 | Greene | 222/397 X |
| 3,000,542 | 9/1961 | Longenecker et al. | 222/389 X |
| 3,156,100 | 11/1964 | Haettinger et al. | 222/389 X |
| 3,282,459 | 11/1966 | Wilson | 220/3 |
| 3,815,773 | 6/1974 | Duvall et al. | 220/3 |
| 3,969,812 | 7/1976 | Beck | 29/421 R |
| 4,073,400 | 2/1978 | Brook et al. | 220/3 X |
| 4,191,304 | 3/1980 | Schiedat | 220/3 X |
| 4,360,116 | 11/1982 | Humphrey | 220/3 |

Primary Examiner—Joseph J. Rolla
Assistant Examiner—Michael S. Huppert
Attorney, Agent, or Firm—Anthony T. Lane; Robert P. Gibson; James T. Deaton

[57] ABSTRACT

An explosion system in which an inner tank is nested within a second and outer tank to provide a very compact and space saving arrangement for an expulsion system for a rocket with the first and inner tank as well as the second and outer tank being reinforced with composite material to provide a space saving and relatively light expulsion system for a rocket.

10 Claims, 2 Drawing Figures

LIQUID FUEL EXPULSION SYSTEM

DEDICATORY CLAUSE

The invention described herein may be manufactured, used, and licensed by or for the Government for governmental purposes without the payment to us of any royalties thereon.

BACKGROUND OF THE INVENTION

In the past, various packaging systems have been provided, however none of them provide as lightweight and economical packaging arrangement as needed. The weight of a system often determines a particular missile system to which the packaging arrangement can be used and further, when used with a liquid system as desired here, the expulsion of that liquid requires a source of pressure.

With the above needs in mind, it is an object of this invention to provide a compact, lightweight and relatively economical fuel expulsion arrangement.

Another object of this invention is to provide an expulsion system that produces structure that can withstand relatively high pressures without unwanted leakage.

Other objects and advantages of this invention will be obvious to those skilled in this art.

SUMMARY OF THE INVENTION

In accordance with this invention, a very economical fuel system is provided that includes a tank within a tank with a piston mounted in the larger tank and shaped to expel a liquid fuel and still maintain a good seal between the pressurizing fluid and the liquid fuel.

DESCRIPTION OF THE PREFERRED EMBODIMENT

Figure 1:
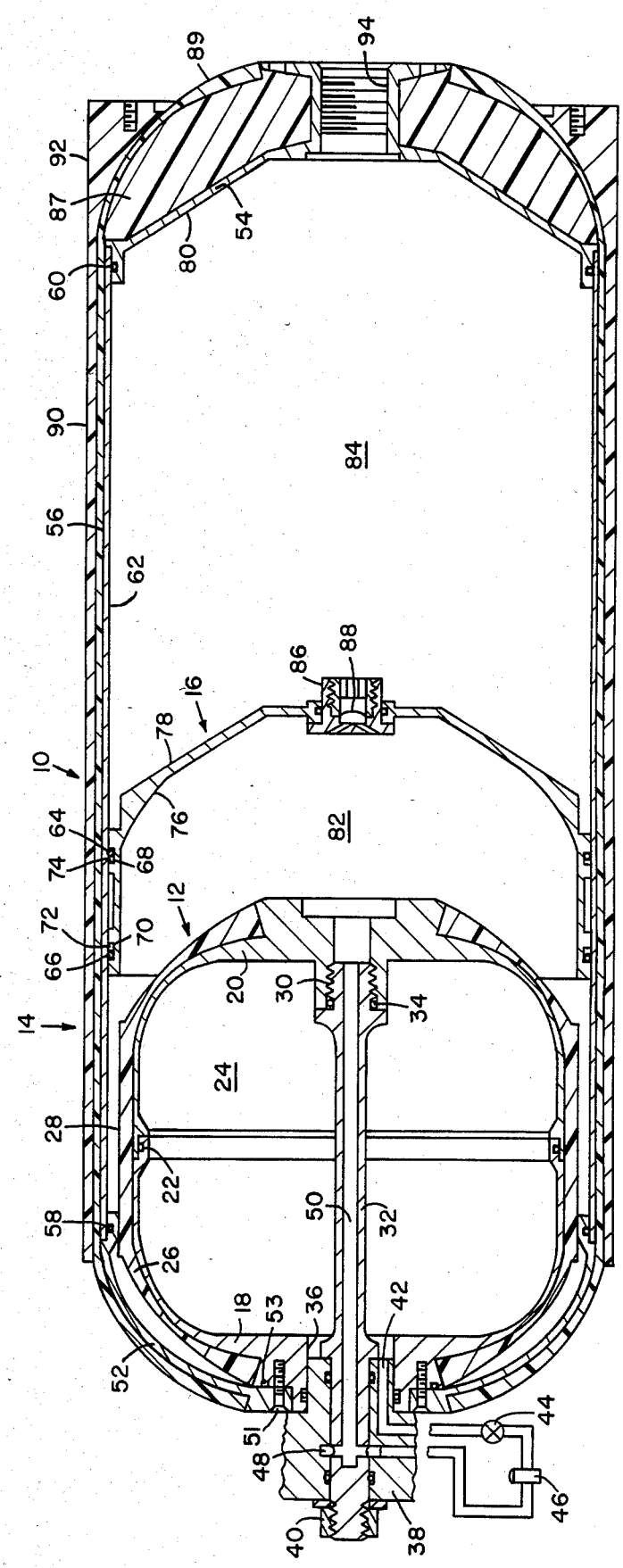
FIG. 1 is a sectional view of an expulsion system in accordance with this invention.

Referring now to FIG. 1 of the drawing, expulsion system 10 in accordance with this invention includes an inner tank 12, an outer tank 14 and an inner piston 16. Inner tank 12 includes members 18 and 20 that are telescoped together and sealed where they telescope such as by an O-ring seal 22 to define a chamber 24 therein. End members 18 and 20 are made of a metal such as aluminum. On the outer surfaces of members 18 and 20, alternate helical and hoop layers of composite material such as fiberglass, graphite, Kevlar and etc., is used in the helical and hoop layers to provide structural support to enable the tank to withstand pressures therein of 5,000 pounds with a burst strength of the tank of about 7,500 pounds. Helical layers 26 run from end to end of the tank structure and hoop layers 28 are at a cylinderical intermediate portion of the tank. The helical and hoop layers are each impregnated with an epoxy as they are added and the layers are added alternately with first a helical layer and then a hoop layer with this being altered until the required number of helical and hoop layers are built up. The tank after being provided with the required number of helical and hoop layers is cured to form a finished structure. End member 20 is threaded at 30 and a center tube member 32 has one end threaded into threads 30 and a seal 34 is provided for sealing between center tube 32 and member 20. End member 18 has an opening 36 therethrough and a manifold type structure 38 is sealably mounted about one end of center tube 32 and in opening 36. Manifold 38 is secured in place by securing means 40 on center member 32. Manifold structure 38 has openings 42 that communicate from chamber 24 to an on-off valve 44 and pressure regulator 46 and from pressure regulator 46 to chamber 48 that communicates with center passage 50 of center tube 32. Outer tank 14 includes end members 52 and 54 that telescope into cylindrical structure 56 and are sealed relative to cylinderical structure 56 by O-ring seals 58 and 60. Each of members 52, 54 and 56 are preferrably made of metal such as aluminum. The internal surface 62 of cylinderical member 56 is preferrably impregnated with teflon to provide a relatively slick and a sealing surface that can be easily sealed relative to a piston such as piston 16 by the use of O-rings 64 and 66 that are mounted in grooves 68 and 70 of piston 16 with each O-ring having an anti-extrusion ring 72 and 74 as illustrated for keeping the O-rings from extruding into the clearance space between the outer surface of piston 16 and the inner surface of cylinder 56. Piston 16 has an inner surface 76 that is contoured to the outer surface of one end of inner tank 12 to provide a minimum volume of dead space between these two members. Piston 16 has outer surface 78 that is contoured to fit internal surface 80 of end member 54. Outer surface 78 and inner surface 80 are contoured such that these two surfaces nest together and prevent any appreciable amount of fuel from being left in tank 14. As can be seen, a chamber 82 is formed on one side of piston 16 and a fuel chamber 84 is formed on the other side of piston 16. Piston 16 has a burst diaphragm arrangement 86 mounted at the center thereof and burst diaphragm 88 is designed to burst from the pressure within chamber 82 when fuel has been expended from chamber 84. Externally of end member 54 a molded syntactic foam 87 of glass microballoons and epoxy is mounted and this foam is of such a structure that forces transmitted from chamber 84 through end member 54 are transfered to outer helical layers 89 that are made of composite materials for supporting the outer tank sufficiently to withstand the pressures exerted thereon. Molded syntactic foam 87 not only acts as a support for transferring forces from end member 54 to outer helical support members 88 but this molded syntactic foam also provides heat insulation for insulating this end of the larger tank from a rocket motor (not shown) that produces heat and such heat being produced would not be desirable to be transmitted or radiated to the fuel in chamber 84. Helical layers 89 are wound from one end of the tank structure to the other and are built-up in layers and hoop layers 90 are also provided about the cylindrical intermediate portion of the tank. These helical and hoop layers can be added as alternate layers of helix and hoop layers. The composite material used in these layers can be fiberglass, graphite, Kevlar, etc., but preferrably is Kevlar. Other conventional composite materials could be used provided the materials have sufficient strength for supporting the tank structure. The composite material is bonded together with an epoxy in conventional manner. A flange 92 for securing the outer tank to a rocket motor or support is wound and machined in a conventional manner at one end of the tank as illustrated. End member 54 has an opening 94 therein that is provided for communicating fuel from chamber 84 to a rocket motor as desired. End member 52 is secured to end member 18 of tank 12 by bolts 51 and O-ring seal 53 is mounted between mating surfaces on members 18 and 52 to seal these members.

Figure 2:
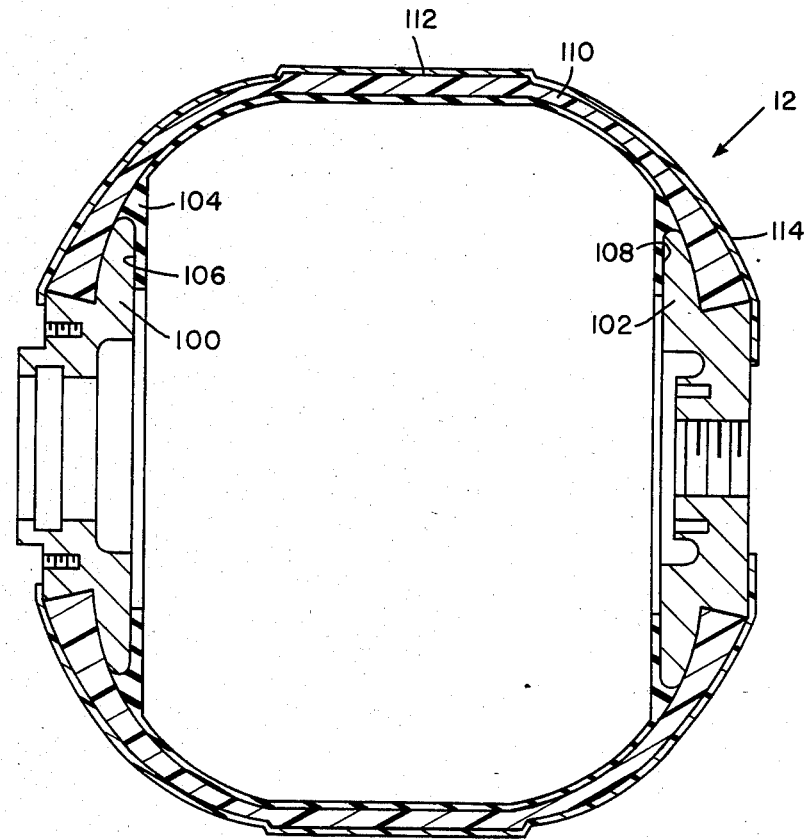
FIG. 2 is a sectional view of an alternate inner bottle that can be used in accordance with this invention.

Another inner tank structure is illustrated in FIG. 2 that can be substituted for the tank structure illustrated at 12 in FIG. 1 and this tank 12 includes end structures 100, 102 that are made of aluminum. An inner liner 104 of isoprene rubber is fiber filled with silicon glass and bonded with conventional adhesive for bonding rubber to metal at surfaces 106 and 108 of end members 100 and 102. Helical layers 110 and hoop layers 112 at the cylindrical portion of the tank are provided and these layers are alternated first with a helical layer and then a hoop layer until sufficient strength is provided for the tank. The helical layers and hoop layers are made of conventional composite materials such as fiberglass, graphite, Kevlar, or other conventional composite materials. These composite materials are epoxy impregnated and allowed to cure after they have been applied. An outer epoxy sealing layer 114 is applied to the outer surface of the overall structure to ensure that an impervious tank structure is provided by sealing from end members 100 and 102 and over the complete surface of the helical and hoop structures. This tank is designed to have a burst pressure of 7,500 psi and is designed to continuously operate at pressure of 5,000 psi. Sealing layer 114 is made of any conventional epoxy sealant type material for sealing structures of this type. In operation, with inner tank 12 filled with a gas such as nitrogen and with chamber 84 filled with the desired fuel such as a monopropellant of hydrazine, on-off valve 44 is opened and regulator 46 regulates the pressure from say 5,000 psi to 900 psi and the inert gas is delivered through passage 50 to chamber 82 for moving piston 16 against the fuel in chamber 84 to expel the fuel through opening 94 to the motor which receives the fuel. As fuel from chamber 84 is expended, outer surface 78 nest into surface 80 of end member 54 and almost all the fuel from chamber 84 is expelled. When this fuel has been expended, the pressure in chamber 82 and across diaphragm 88 creates a differential pressure across diaphragm 88 such that diaphragm 88 is ruptured and the gas remaining in tank 12 and in chamber 82 serves to expend substantially all of the fuel and allow the structure to be safely recovered for examination without subjecting the test engineer to unnecessary risk or injury in examination of the expulsion system.

It will be appreciated that the expulsion system in accordance with this invention has the advantage of being much lighter in weight than conventional metal tankage systems of equal pressure capacity due to the higher specific strength of composite materials. In addition, a packaging advantage exists due to higher volume efficiency which results from nesting the piston over the enternal high pressure bottle. It will also be appreciated that the piston is shaped to rest against the end member and nest therein to minimize space required and at the same time to ensure that the fuel is all expelled.

We claim:

1. A liquid expulsion system comprising a first tank including inner tank structure and composite reinforcing material mounted about said inner tank structure and said first tank being designed for containing a pressurized fluid therein, a second and larger tank secured to an mounted about said first tank and completely enclosing said first tank and defining a chamber in said second tank for the storage of fuel, and said second tank being constructed of metal inner structures that are sealably and slidably mounted together to form a metal inner structure that includes forward and aft ends with intermediate cylindrical structure and with helical and hoop reinforcing outer layers of composite material mounted about said metal inner structure to enable the second tank to be made to enclose said first tank and provide a compact and lightweight packaging arrangement of the tanks and means sealing said first tank and said second tank at a front dome portion of said first tank and at said forward end of said second tank.

2. An expulsion system as set forth in claim 1, wherein said second tank has an inner surface that is cylinderical in shape and a piston is sealably and slidably mounted relative to said inner cylinderical surface to define first and second chambers on opposite sides of said piston.

3. An expulsion system as set forth in claim 2, wherein said piston is shaped on one side for nesting over one end of said first tank to minimize dead space between said first tank and said piston and the other side of said piston being shaped to conform to a shape of an inner surface of said aft end of said second tank to ensure that the volume of said second chamber is a minimum when said piston comes to rest at said aft end of said second tank, and said aft end of said tank having an opening therethrough for providing an outlet from said second chamber.

4. An expulsion system as set forth in claim 3, wherein said piston has a rupture diaphragm mounted therein and wherein said rupture diaphragm is designed to rupture when a predetermined pressure is applied across said diaphragm.

5. An expulsion system as set forth in claim 3, wherein said first tank has means communicating the inner portion of said tank with an on-off valve and a regulator valve in communication with said on-off valve and said regulator valve being connected to a center structure that communicates with said first chamber for causing said piston to be acted upon by pressure to move the piston in the direction of the aft end of said second tank.

6. An expulsion system as set forth in claim 1, wherein said first tank includes forward and aft metal structures that are telescoped together and sealed relative to each other and said composite reinforcing material about said inner tank structure including said forward and aft structures of said first tank having helical and hoop layers of composite material mounted thereon for providing sufficient strength to the first tank to withstand high pressures within said first tank.

7. An expulsion system as set forth in claim 6, wherein said helical and hoop layers are applied alternately to said external surface of said first tank and said hoop layers being applied at a cylinderical intermediate section of said first tank.

8. An expulsion system as set forth in claim 1, wherein said inner tank structure of said first tank includes forward and aft ends that are interconnected by being bonded to an isoprene rubber liner that is fiber filled with silicon glass, said composite reinforcing material about said inner tank structure including said first tank having a multiplicity of helical and hoop layers mounted over a portion of said end structures and said liner for providing sufficient strength to said first tank to enable it to contain a high pressure fluid therein, and an outer sealing material layer over said composite helical and hoop layers and a portion of said end structures to provide an imprevious seal on the outer surface of said first tank.

9. An expulsion system as set forth in claim 1, wherein said second tank aft end has a molded syntactic foam at said aft end and is provided with helical layers of composite material over the molded sintactic foam and said syntactic foam serving to heat insulate this end of said second tank and to provide sufficient strength for transferring forces applied to an internal surface of said aft end to said composite helical layers.

10. An expulsion system as set forth in claim 1, wherein said second tank intermediate cylincrical structure defines an inner cylindrical surface that is impregnated with teflon to provide a good piston sealing surface, said second tank having a piston mounted therein and sealably and slideably mounted relative to said cylindrical surface for defining a first chamber on one side of said piston and a second chamber on an opposite side of said piston and said second chamber being said chamber for the storage of fuel.

* * * * *